Dec. 12, 1944.   B. GROB ET AL   2,364,969
WORK FEED
Original Filed Jan. 10, 1938   2 Sheets-Sheet 2
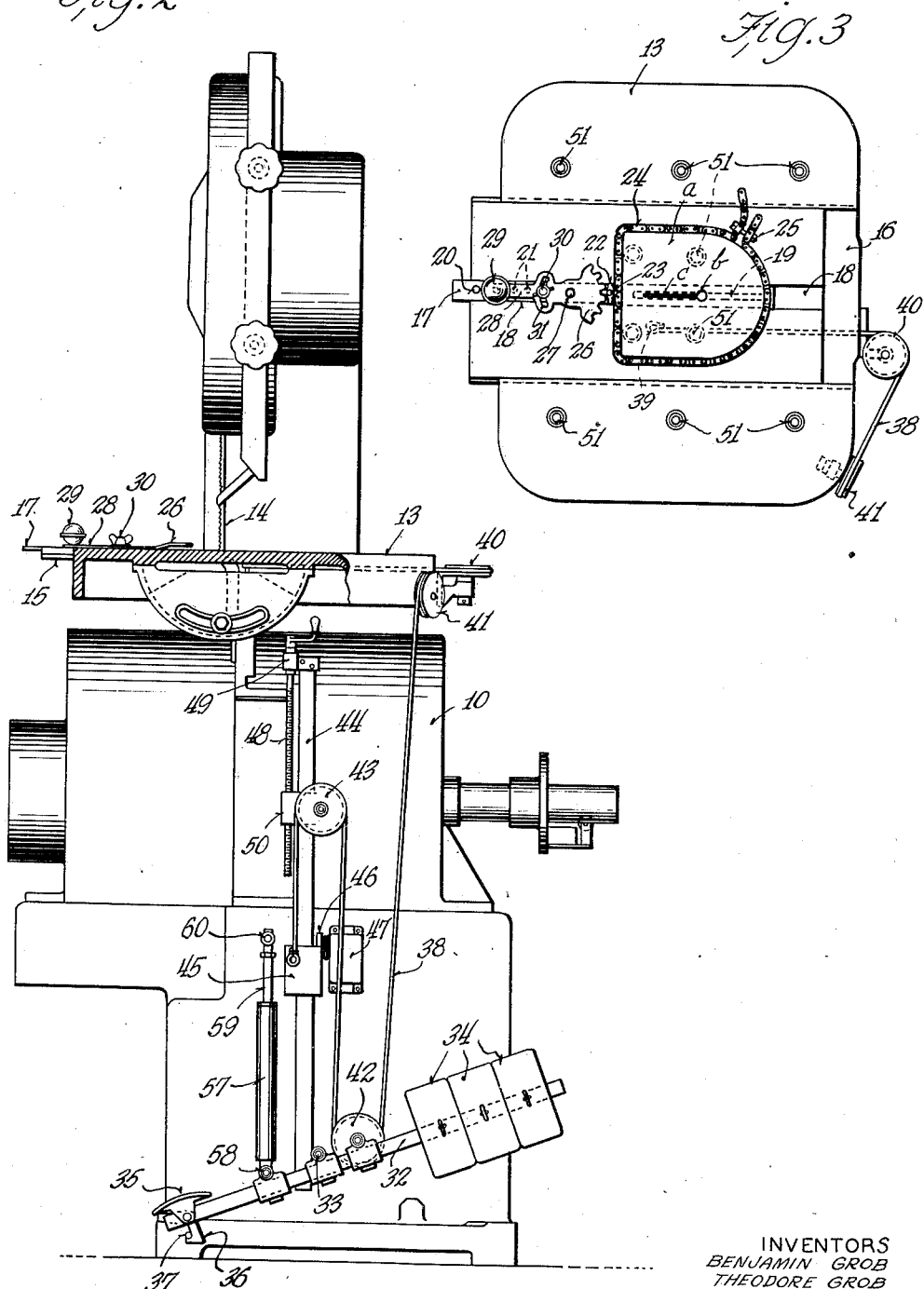
INVENTORS
BENJAMIN GROB
THEODORE GROB
BY
ATTORNEY Patented Dec. 12, 1944

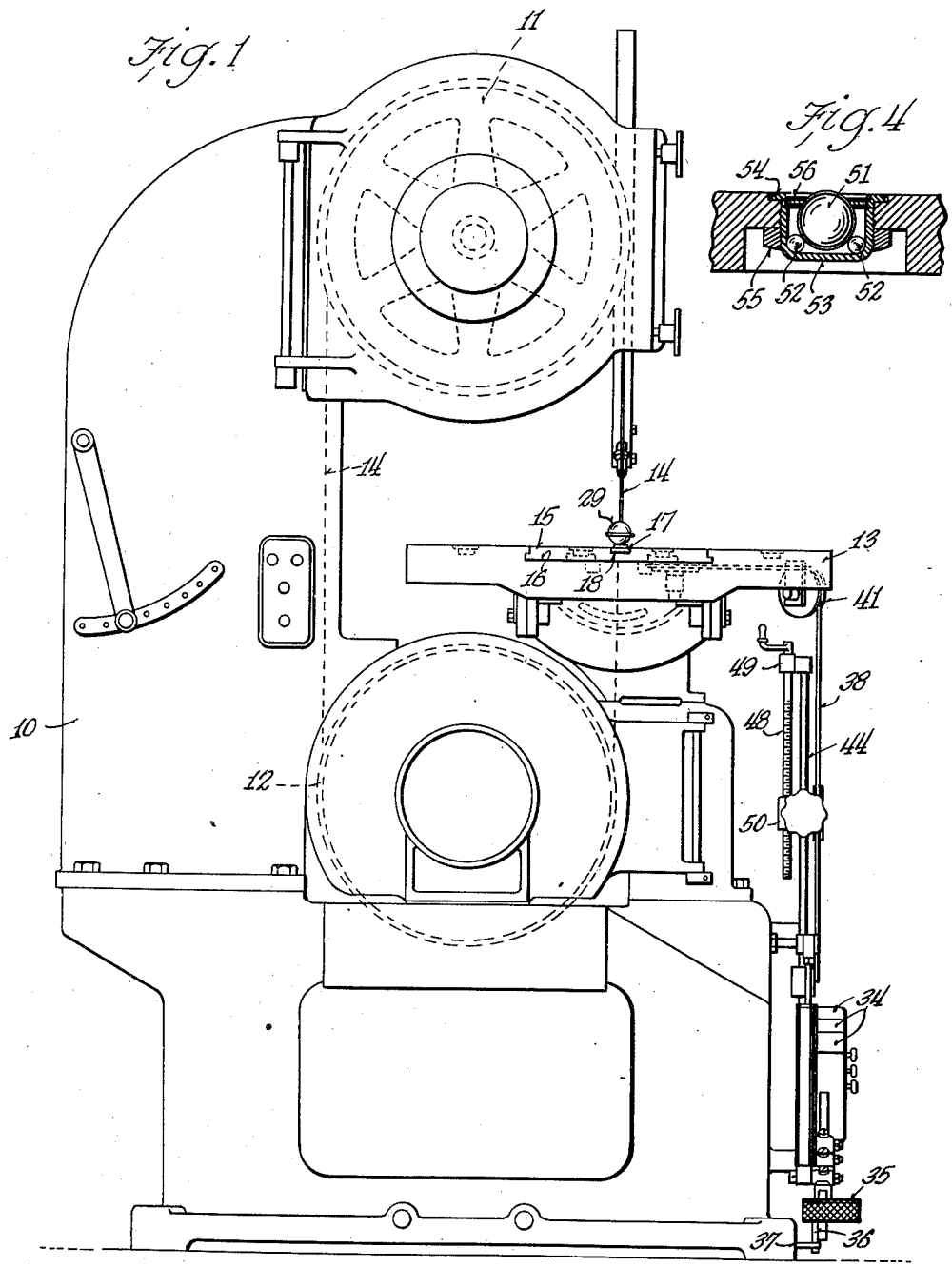

2,364,969

UNITED STATES PATENT OFFICE 2,364,969

WORK FEED

Benjamin Grob and Theodore Grob,
Grafton, Wis.

Original application January 10, 1938, Serial No. 184,164. Divided and this application June 23, 1941, Serial No. 399,282

4 Claims. (Cl. 29—67)

This application is a division of our copending application, Serial No. 184,164, filed January 10, 1938, which has matured into Patent No. 2,253,515.

The invention of this application relates to work feeding mechanism for power operated saws and the like.

One object of the present invention is to provide an improved work positioning and guiding mechanism for power operated saws and the like.

Another object is to provide an improved work feeding mechanism for power operated saws which will effectively advance the work and accommodate steering movements thereof without imposing objectionable lateral stresses on the saw blade.

Another object is to provide work feeding mechanism for power operated saws and the like in which the thrust by which the work is advanced is maintained along a line substantially coincident with the line of cut regardless of variations in angular position of the work piece relative to the saw blade.

Other more specific objects and advantages will appear from the following description of an illustrative embodiment of the present invention.

In the accompanying drawings:

Figure 1 is a front elevation of a power operated band saw machine equipped with a work feeding mechanism constructed in accordance with the present invention.

Fig. 2 is a side elevation.

Fig. 3 is a plan view of the work table of that machine.

Fig. 4 is a fragmentary sectional view of the work table, on a larger scale, showing one of a number of anti-friction devices included therein.

The band saw machine selected for illustration is fully described in our copending application hereinabove identified. It comprises a conventional frame 10 supporting an upper pulley 11 and a lower power actuated drum 12, respectively disposed above and below an appropriate work table 13. In this instance the saw blade 14 is in the form of a band trained over the pulley 11 and having its ends wrapped about the drum 12 in such manner that during operation one stretch of the band follows a fixed path downward through a predetermined point in the work table so that a work piece on the table may be sawed by advancing the same against the forward edge of the downwardly travelling band. As fully disclosed in said above identified application, the leading end of the saw band may be detached from the drum 12 to permit the same to be threaded through an opening in the work piece preparatory to making an internal saw cut therein.

The machine shown is equipped with a work positioning, guiding and feeding mechanism embodying the present invention and which will now be described. This mechanism, as shown, includes a work carrier in the form of a slide plate 15 closely guided in a channel 16 formed in the face of the work table 13 and extending parallel to the faces of the saw blade 14 and consequently parallel to the line of cut. The plate 15 carries a bar 17 adjustably seated in a narrow guide channel 18 formed in the face of the plate 15 and extending parallel to the channel 16 and along the line of cut. The bar 17 is so disposed that its central longitudinal axis is disposed within the central plane of the saw blade, the bar 17 and plate 15 being slotted, as at 19, to accommodate the saw blade during travel of the plate 15 in its guide 16. The bar 17 is longitudinally adjustable in the channel 18 and may be fixed in various positions of adjustment by appropriate means, such as a removable lock pin 20 therein engageable with any of a series of holes 21 formed in the base of the channel.

The bar 17 carries a thrust element 22 in the form of a small sprocket gear journalled on a pin 23 fixed in the bar. The sprocket gear meshes with a sprocket chain 24 encircling the work piece $a$ and tightly secured thereto by appropriate means such as a clamp bolt 25. It will of course be understood that the work piece $a$ may be of any shape or size within the capacity of the machine, that shown being a sample which is being internally sawed, the saw blade having been initially entered through an opening $b$ and having produced a partial saw cut $c$ therein by advancing the slide plate 15, bar 17, sprocket gear 22, and work piece toward the right in Fig. 3.

It will be noted that the center of the sprocket gear 22 is disposed within the plane of the saw blade, so that as the carrier plate 15 advances, the advancing thrust transmitted to the work piece through the gear 22 is always in line with the cutting progress of the saw. It will also be noted that, so long as the gear 22 is fixed against rotating, it coacts with the chain 24 and with the saw blade to hold the work piece against turning, so that the progress of the cut then follows a straight line course. It will also be understood that by rotating the gear 22 in one direction or the other, the work piece may be thereby turned in either direction about the cutting edge of the saw blade to thereby cause the saw to depart in one direction or the other from its normal straight line course through the work, and during such steering movements of the work piece the gear 22 remains in line with the saw blade, so that the advancing thrust transmitted thereby to the work piece remains at all times in line with the cutting progress of the saw.

Rotation of the gear 22 may be controlled in various ways, but in the machine shown this is accomplished by the use of a segmental gear 26 meshing with the gear 22 and journalled upon a pin 27 fixed in the bar 17. The gear 26 is preferably manually controlled by an appropriate lever 28 rigidly connected thereto and equipped with a convenient operating handle or knob 29. The lever 28 may be releasably fixed in any position of adjustment by appropriate means, such as a clamp screw 30 carried by the bar 17 and coacting with a slotted quadrant 31 on the lever.

Although the carrier slide 15 may be manually advanced to advance the work piece against the saw blade in the manner above described, provision is made in the machine shown for effecting automatic advance thereof. The means shown for that purpose is designed to maintain a predetermined thrust of the work against the saw and for that purpose it is gravity actuated. It comprises an actuating and control lever 32 rockably supported, as at 33, on the base of the machine and having a plurality of weights 34 removably and adjustably attached to one end thereof. The lever 32 is provided at its other end with a conveniently arranged pedal 35 rockably mounted thereon and connected to operate a depending latch 36 disposed to engage an anchor pin 37 on the base of the machine in a manner to releasably sustain the weighted end of the lever 32 in elevated position, a position assumed preparatory to a sawing operation.

A cable and pulley system provides a convenient operating connection between the weighted lever 32 and the carrier slide 15. In this instance a cable 38, attached at one end 39 to a pin projecting from the bottom of the carrier slide 15 and through an appropriate opening in the channel 16, is trained over a pair of guide pulleys 40 and 41 on the work table 13, beneath a supporting pulley 42 on the lever 32, and about a pulley 43 adjustably mounted on a vertical guide bar 44, the other end of the cable being attached to a slide block 45 on the guide bar 44 below the pulley 43. The vertical guide bar 44 is fixed to the side of the machine frame adjacent and above the lever 32. The slide block 45 is limited in its upward movement along the bar 44 by a stop element 46 constituting part of a switch member 47 attached to the machine frame and forming part of a safety control system fully disclosed in said above identified copending application but constituting no part of the present invention. The slide block 45 is, during a sawing operation, retained in contact with the stop element 46 by the tension in the cable. The pulley 43 is vertically adjusted and controlled by appropriate means such as a lead screw 48 journalled in a suitable bracket 49 fixed on the guide bar 44 and threaded through the slide block 50 on which the pulley 43 is mounted.

In preparing for a sawing operation the thrust bar 17 is ordinarily initially set in retracted position in the retracted carrier slide 15 with the steering lever 28 fixed in the intermediate position shown, and the work piece, with the chain 24 clamped thereon, is then placed in preliminary sawing position on the slide 15 with the chain 24 engaged with the thrust gear 22. With the weighted lever 32 fixed in the upper position shown by the latch 36 and pin 37, the screw 48 is operated to lift the pulley 43 and thereby take up all slack in the cable 38 and position the slide block 45 against the stop element 46. Then after the saw blade 14 has been set in motion, the pedal 35 is rocked to release the latch 36 from the pin 37 and thereby release the lever 32, whereupon the carrier slide 15 advances under the force transmitted from the weights 34 through the cable 38, and the work piece is thereby fed against the saw by the thrust imposed through the gear 22.

The sawing then normally proceeds along a straight line course as the work is advanced with the carrier slide 15 along the guideway 15, but if it is desired to depart in one direction or the other from that course, this is accomplished by releasing and swinging the steering lever 28 and segmental gear 26, so as to rotate the pinion 22 and thereby cause the work to swing in the desired direction about the cutting edge of the saw blade.

The progress of the sawing operation may be interrupted merely by depressing the pedal 35 so as to release the tension in the cable 38, and at the end of the sawing operation the pedal 35 is depressed sufficiently to permit re-engagement of the latch 36 with the pin 37.

If the length of the desired saw cut is greater than can be effected in one downward movement of the weights 34, the operation may be repeated, the work piece being, when necessary, set forward on the carrier slide 15 by advancing the bar 17 along its guideway 18 into a new position of adjustment therein, or the weights 34 may be re-elevated by adjusting the pulley 43 to a higher position on the guide bar 44.

In order to permit the work piece to turn freely about the cutting edge of the saw blade whenever the steering lever 28 and gear 22 are rotated, so as to relieve the saw blade of objectional side stresses, an appropriate anti-friction work support is preferably provided. In the machine shown this is accomplished by the use of a plurality of anti-friction balls 51 counter-sunk at rather regular intervals in the top faces of the work table 13 and carrier slide 15. As indicated in Fig. 4, each ball 51 rests upon a circular series of balls 52 confined in the bottom of a cup-shaped bushing 53. Each bushing is supported by a top flange 54 and is locked in place by a suitable retainer ring 55. Each ball 51 projects slightly above the bushing into work engaging position and is retained by a ring 56 seated in the top of the bushing.

It will of course be understood that during the sawing operation the degree of feeding pressure between the saw and work is determined by the size and position of the weights 34 upon the lever 32, and that they may be regulated as desired to best suit the particular piece of work being operated upon. In any case however the work is thus advanced at substantially constant pressure which is a highly desirable condition, except that unless provision be made to prevent it, the work will jump ahead suddenly whenever the saw breaks through at an end of a cut or whenever, as in some cases, the saw suddenly enters an opening in the work piece. Such jumping is objectionable and a common cause of damage to the saw, and in the machine shown provision is made to prevent it. In this instance this is accomplished by the use of a well known type of dash-pot mechanism 57 of a direct single acting piston-and-cylinder type, the cylinder thereof being rockably connected at one end 58 to the lever 34 and the piston rod 59 being rockably connected at 60 to the frame of the machine. The dash-pot shown functions to permit free upward movement of the weights 34 but to resist rapid lowering thereof.

Various changes may be made in the embodiment of the invention hereinabove specifically described without departing from or sacrificing the advantages of the invention as defined in the appended claims.

We claim:

1. A work feeding mechanism for power operated saws and the like, said mechanism comprising a work holder, a carrier guided for rectilinear movement, and an element for applying a feed thrust to the work and moveable with said carrier to feed the work against the saw, said element being rotatable about an axis disposed substantially within the plane of action of said saw and in rolling engagement with said holder to regulate the angular position of said holder and work relative to the saw.

2. A work feeding mechanism for power operated saws and the like, said mechanism comprising a work holding chain, a carrier guided for rectilinear movement, and a gear rotatably mounted on said carrier to move therewith, said gear being engaged with said chain to feed the work against the saw and to regulate the angular position of the work relative to the saw.

3. A work feeding mechanism for power operated saws and the like, said mechanism comprising a carrier guided for rectilinear movement, actuating means therefor, a work holder, a work thrusting element coacting with said holder and moveable with said carrier to feed the work against the saw, said element being rotatably adjustable during the feed movement to steer the work relative to the saw, and means for adjusting said element relative to said carrier in a direction toward and from said saw to accommodate the same to various kinds of work.

4. In a machine of the character described, the combination of a table having a work supporting surface, a cutting tool extending through said table, a slide guided in the top of said table for rectilinear movement, actuating means for said slide, a work holder, an element carried by said slide and coacting with said work holder to feed a work piece toward said tool, said element being mounted for angular adjustment about an axis fixed relative to said slide, and means for angularly adjusting said element during the feed movement to thereby angularly adjust the work piece relative to said tool.

BENJAMIN GROB.
THEODORE GROB.